United States Patent Office 2,939,854
Patented June 7, 1960

2,939,854

UNSATURATED CARBOXYLIC ACIDS IN INTERPOLYMER RESINS

Roger M. Christenson, Whitefish Bay, Wis., assignor to Pittsburgh Plate Glass Company, Allegheny County, Pa., a corporation No Drawing. Filed June 23, 1953, Ser. No. 363,690

4 Claims. (Cl. 260—22)

This invention relates to the preparation of novel copolymers and interpolymers, and pertains more particularly to soluble, ungelled copolymers of liquid ethylenically unsaturated monomeric compounds with neutral polyesters of (a) a hydroxyl ester of a drying oil acid and a polyhydroxy compound and (b) an unsaturated polycarboxylic acid, said copolymers having incorporated therein additional free ethylenic carboxylic acid. These copolymers and interpolymers adhere firmly to metals such as aluminum. The addition of the free ethylenic carboxylic acid is also found to improve the compatibility of the polyesters with soluble resins formed by condensation of amines and amides with carbonyl compounds such as aldehydes. The products resulting from the combination of the copolymers and the resins are of substantially improved hardness. They, accordingly, are very useful as vehicles for coating compositions as well as for many other purposes.

It has heretofore been proposed to modify glyceride oils and notably the drying oils, such as linseed oil or soya oil with monomers, such as styrene, containing $>C=CH_2$ groups, in order to improve chemical resistance or other properties. However, such modified oils, when spread, and dried, are lacking hardness and mar resistance. It might be suggested to improve these properties by addition to the oil, of heat hardenable nitrogenous resins as anti-marring agents. However, this is not directly feasible because these latter are incompatible with conventional styrene modified glyceride oils.

In a copending application, Serial No. 334,970, filed February 3, 1953, it is disclosed that excellent copolymers or interpolymers containing large amounts esterified fatty acids from glyceride oils such as drying oils and which are very valuable as coating media for wood and other materials, can be prepared by polymerizing in a solvent, a mixture of (A) a liquid, ethylenically unsaturated, monomeric compound and (B) an essentially neutral polyester of an alpha-beta ethylenic dicarboxylic acid, a glyceride oil acid (notably a drying oil acid) and a polyol (polyhydric alcohol). If the polymerization is conducted in the presence of a solvent for the components of the polymerization mixture, the resulting copolymers and interpolymers are clear, ungelled products which are readily soluble in conventional solvents and which can be utilized to prepare coatings having unusually good flexibility, chemical resistance, and drying speed.

It has now been discovered that the addition of free unsaturated carboxylic acids, such as acrylic acid or the like to the interpolymers of unsaturated monomers such as styrene and neutral polyesters of (a) hydroxyl esters of a drying oil acid and a polyhydroxy compound and (b) an ethylenically unsaturated polycarboxylic acid, quite unexpectedly, has the effect of greatly increasing the compatibility of the interpolymers with respect to nitrogen containing resins such as melamine or urea resins so that compositions adapted to harden to films of increased mar resistance are obtained.

The preparation of an essentially neutral base polyester comprising polyhydric alcohol or alcohols, fatty acid or acids, and alpha-beta ethylenic dicarboxylic acid components, for use in the practice of this invention may essentially follow the techniques disclosed in the previously mentioned copending application. The same polyhydric alcohols, fatty acids, and alpha-beta ethylenic dicarboxylic acids are utilized but with the addition of the unsaturated acid to the interpolymerizable mixture.

The process of this invention comprises the three essential steps set forth in the copending application and includes the addition of the free ethylenic carboxylic acid or anhydride to the interpolymer composition. In the first step, an ester of a drying oil acid suitable for subsequent esterification with an ethylenically unsaturated polycarboxylic acid is prepared. The first step ester may be prepared by any of the well-known techniques of esterification. For example, the free-drying oil acid such as may be obtained by hydrolysis of drying oils or oils containing drying oil acids may be reacted with a polyhydroxy compound such as a glycol, glycerol, or other polyhydroxy compound containing two or more hydroxyl groups, preferably but not necessarily, in such proportion as to provide one free hydroxyl group in each molecule of the resultant polyhydric alcohol-drying oil acid ester.

A more common procedure in preparing esters of drying or semi-drying oils is partially to alcoholize a drying oil such as linseed oil or soya oil with an alcohol such as glycerol or the like, which alcohol contains a plurality of hydroxyl groups in the molecule. In the event that glycerol is employed as the polyhydric alcohol for alcoholysis of the drying oil, diglycerides are formed in substantial quantities. Of course, where conventional oils are employed in the alcoholysis reaction, there will be considerable variation in the structure of the products. In most instances, however, many of the acid groups will include a plurality of double bonds. It may also be that some monoglycerides are formed and there will ordinarily be some unchanged polyhydric alcohol and unchanged glycerides remaining in the mixture. However, it appears that a large proportion, probably a majority, of the ester molecules are monohydric. It is improbable that more than 50 molar percent of glyceride molecules are dihydric and it is more likely that the proportion of dihydric molecules is about 30 percent or less upon the basis of the total glyceride molecules. In some instances, it probably approaches 0.

Any polyhydric alcohol may be employed in preparing the esters of fatty acids or drying oil acids in the first step of the present process. Preferably, the polyhydric compound contains from about 2 to 6 hydroxyl groups per molecule. Examples of polyhydric compounds which may be utilized include ethylene glycol, diethylene glycol, propylene glycol, glycerol, pentaerythritol, polyethylene glycol, sorbitol, tetramethylolcylohexanol, alpha methyl glucoside, erythritol, dipentaerythritol, polypentaerythritol, polyallyl alcohol, and the like, as well as mixtures of any two or more of the above polyhydric compounds.

The drying oil acids in the first step esters prepared in accordance with the present invention include the acids of substantially any of the glyceride oils recognized as having drying properties. The acids of the so-called semi-drying oils are also included. In conventional stocks of free fatty acids and in the conventional glyceride oils of such acids, a plurality of acids will occur as a mixture, either in free or in the combined state. In most instances, some saturated acid such as stearic acid or palmitic acid, as well as semi-saturated acids such as oleic acid will be present in admixture with the more highly unsaturated acids such as linoleic acid or linolenic acid. The mixed acids may be employed, as may the relatively pure acids such as are obtained by distillation of the acid mixture under vacuum. Oils consisting essentially of non-drying constituents, for example coconut oil and palm kernel oil, may also be utilized with good results.

Convenient sources of these acids are the drying and semi-drying oils such as linseed oil, cottonseed oil, safflower oil, soybean oil, tung oil, oiticia oil, menhaden, oil, sardine oil and the like. Soap stocks from the refining of these oils are also sources of acids which may be utilized in the process of this invention.

Additionally, the esterification may be carried out utilizing a mixture of a polyhydric alcohol with one of the drying oil acids set forth hereinabove, together with a saturated polycarboxylic acid such as isophthalic acid, succinic acid, glutaric acid, adipic acid pimelic acid, suberic acid, azelaic acid, phthalic acid and the like.

Where the hydroxy esters of drying oil acids with a polyhydric alcohol are prepared by alcoholysis of the glyceride oil with a polyhydric compound, the techniques commonly employed in the preparation of esters for the modification of alkyd resins may be utilized. Such alcoholysis is a well-known procedure and involves heating the oil with the desired proportion of the polyhydric compounds, preferably in the presence of an alcoholysis catalyst such as litharge, and also in the presence of an inert gas designed to prevent oxidation of the double bonds of the hydrocarbon groups in the fatty acids. Temperatures in the range of about 150 degrees C. to 300 degrees C. or higher are ordinarily utilized in preparing the drying oil esters.

Any ethylenically unsaturated polycarboxylic acid may be reacted with the first step ester to form essentially neutral esters in accordance with the second step of the process. Included within this class of compounds are maleic acid and the like. Preferably, the acid contains at least one carboxyl group in alpha relationship to the ethylenic group to provide C=C—C=O. Unsaturated polycarboxylic acids containing halogen or other substituent groups may also be utilized, as may the anhydrides of the unsaturated polycarboxylic acids; in fact, the anhydrides are preferably utilized in the esterification reaction and it is intended that the term "acid" include the corresponding anhydride.

The esterification reaction between the ethylenically unsaturated polycarboxylic acids selected from the group disclosed and the ester of the drying oil acid and polyhydric compound to form essentially neutral esters is preferably carried out in an inert diluent which is heated to refluxing temperature. The diluent may be a material such as xylene, toluene, solvent, naphtha or any other suitable liquid solvent which is non-reactive with the ethylenically unsaturated polycarboxylic acid and the ester of the drying oil acid with the polyhydric compound and which is of reasonably high boiling point. Normally, this esterification reaction is conducted under an azeotropic separator designed to pass the evolved water from the system while returning the solvent for further cycling in the reaction. Since the solvent is thus recycled or refluxed, the reaction may be conducted with relatively small amounts thereof, for example, from about 10 to 20 percent based on the total weight of the reactants, although even smaller or larger amounts may be utilized if desired.

The reaction may be carried out in any convenient apparatus. For example, on a laboratory scale, the reaction may be carried out in a conventional glass flask provided with temperature measuring means, a reflux condenser and like conventional devices. When the reaction is carried out on a larger scale, for example, such as may be employed in a factory, a conventional kettle such as a stainless steel kettle commonly used in the paint and varnish industry, is satisfactory. This may be provided with temperature measuring means, agitators, condensers, sources of inert gas and the like. The apparatus should also be provided with suitable means for obtaining desired reaction temperatures. Suitable heating devices include steam or electrical coils or gas burners and the like. Means should also be available for taking small samples from the reaction mixture in order to test periodically the viscosity, acid number and like criteria of esterification reactions.

The esterification reaction is customarily carried out at the boiling temperature of the mixture of reactants and solvent, if any, until water ceases to evolve, or until the reaction temperature reaches a predetermined value, or until the polyester reaches a predetermined viscosity value as determined by standard viscosity tests. In any event, the reaction is stopped before the product becomes infusible and insoluble in petroleum naphtha. Normally such value will be obtained at a reaction temperature within the range of 150 degrees C. to 250 degrees C. In order that the functionality of the unsaturated acid double bonds will not be substantially reduced, the temperature should be maintained at a level below that at which the acid will add to the oil. In most cases, the reaction is sufficiently complete in a period of about 2 to 20 hours.

The proportions of the ethylenically unsaturated polycarboxylic acid and the ester of the drying oil acid with the polyhydric compound which are utilized in preparing the second step product are important in obtaining a product which may in turn be polymerized with a compound containing a terminal $CH_2=C<$ grouping to form a soluble, ungelled interpolymer. Generally, the reactants will be so proportioned that the esters formed will have a fatty acid content which, if calculated as equivalent glyceride oil, would constitute about 75 percent to 90 percent by weight of the total mixture of reactive components of the ester system. The ethylenically unsaturated polycarboxylic acid ester groups in the molecules of the resulting ester of the unsaturated acid and the fatty acid will constitute about 10 percent to 25 percent by weight of the total ester product. Free polyhydroxy compound may also be present in the esters of the unsaturated acid in small quantities. Stated in still another way, the ethylenically unsaturated polycarboxylic acid or its anhydride may be employed in such an amount that from 25 to about 50 molar percent of the hydroxyl groups of the polyhydric compound are esterified by the ethylenically unsaturated polycarboxylic acid. The preferred range is about 33 to about 45 molar percent. If the foregoing proportions are substantially departed from, unfavorable results are likely to be obtained. For example, if too large a proportion of fatty acid is present, an unhomogeneous reaction product will result. If too small a proportion of fatty acid is present, the mixture may tend to gel when the ethylenic compound is added thereto.

It is to be understood that the relative proportions of the constituents of the ethylenically unsaturated polycarboxylic acid ester will vary for different oils and acids. Also, the polyhydric compound influences the permissible proportions, as do the excesses of the polyhydric compound, the solvent employed, the reaction catalyst if any, the amount of catalyst and the method of adding the catalyst. The composition of the polyester mixture may also be influenced by the ethylenic compound which is subsequently employed in the copolymerization. However, satisfactory proportions will, in general, be found in the above indicated ranges.

The esters of the ethylenically unsaturated polycarboxylic acid and the drying oil acid-polyhydric compound esters obtained in the second step process are of low acid number, for example 15 or lower, so that it is apparent that very few available carboxyls are present in the resultant ester. The ester is, therefore, not a partial or a half ester, but rather is an essentially neutral ester. The preparation of such an essentially neutral ester and its subsequent polymerization with a compound containing a terminal $CH_2=C<$ group constitutes a most unusual feature of the present invention since it has heretofore been believed impossible to polymerize a substantially neutral ester of an ethylenically unsaturated polycarboxylic acid with a drying oil-polyhydric compound ester and a compound containing a terminal $CH_2=C<$ group to obtain a soluble, ungelled copolymer. In fact, it has been believed heretofore that a half ester must be polymerized with an ethylenic monomer and the polymer subsequently esterified in order to obtain a resultant copolymer which would be ungelled and readily soluble in conventional solvents.

The third step of the process of the present invention and the step whereby soluble, ungelled interpolymers desirable for coating metals are obtained, involves the interpolymerization of the ester obtained in the second step, that is, the ester prepared by esterification of an ethylenicaly unsaturated polycarboxylic acid with an ester of a drying oil acid, polyhydric compound, a monomeric material, preferably one containing the terminal $CH_2=C<$ grouping and an ethylenically unsaturated carboxylic acid or its anhydride. Included among the compounds possessing the $CH_2=C<$ grouping and which may be polymerized with the second step ester in accordance with this process are:

(1) Monoolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-propene-1, 2-methyl-butene-1, 2-methyl-pentene-1, 2,3-dimethyl-butene-1, 2,3-dimethyl pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2,4,4-trimethyl pentene-1, 2-methyl-octene-1, 2,6-dimethyl-heptene-1, 2,6-dimethyl-octene-1, 2,3-dimethyl-decene-1, 2-methyl-nona-decene-1, ethylene, propylene, butylene, amylene, hexylene and the like;

(2) Halogenated monoolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, 1,1,2,2-tetrafluoroethylene, 1,1,2,2-tetrachloroethylene, 1-chloro-2,2,2-trifluoroethylene and the like;

(3) Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybendoate, vinyl p-ethoxybendoate, methyl methacrylate, ethyl methacrylate, propyl methacrylate, butyl methacrylate, amyl methacrylate, hexyl methacrylate, octyl methacrylate, decyl methacrylate, methyl crotonate, ethyl crotonate and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acryalte, octy acrylate, 3,5,5-trimethylhexyl acrylate, decyl acrylate and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl c-bromobenzoate, isopropenyl m-chlorobenzoate, isopropenyl toluate, isopropenyl alpha-chloroacetate and isopropenyl alpha bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, ally thiocyanate, allyl formate, allyl acetate, allyl propionate, allyl butyrate, allyl valerate, allyl caproate, allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters as well as esters from such alkenyl alcohols as beta-ethyl allyl alcohol, beta-propyl allyl alcohol, 1-buten-4-ol, 2-methyl-buten-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha- chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate and diethyl glutaconate;

(4) Organic nitriles such as acrylonitrile, methacrylonitrile, ethacrylonitrile, 3-octenenitrile, crotonitrile, oleonitrile, and the like;

(5) Acid monomers such as acrylic acid, methacrylic acid, crotonic acid, 3-butenoic acid, angelic acid, tiglic acid and the like;

(6) Organic amides containing $>C=CH_2$ groups and being represented by acrylamide, methacrylamide, n-tertiary butyl acrylamide, methylene bis-acrylamide, and the like.

It is to be understood that the above polymerizable mono-olefinic monomers represent but a relatively small percentage of the monomers which may be polymerized with the second step product to form the copolymers and interpolymers of the present invention.

Naturally, some of these, because of ease of procurement, or because their use results in superior products, are more useful than others, although they are all included within the purview of the invention. A few monomers or monomer mixtures which when employed with a free ethylenic acid in a substantially neutral polyester of a fatty acid, an ethylenic carboxylic acid and one or more polyols, are deemed to be very useful, include:

Styrene, styrene and alpha-methyl styrene, methyl methacrylate, styrene and butadiene, styrene and acrylonitrile, styrene and vinyl ethers such as vinyl ether or vinyl butyl ether, vinyl acetate and vinyl chloride, vinyl acetate, styrene and methyl methacrylate, styrene, acrylonitrile and alpha methyl styrene, vinyl toluene, styrene and cyclohexene.

Unsaturated carboxylic acids which, in accordance with this invention, are advantageously incorporated with copolymers or interpolymers of the foregoing type to impart high compatibility with nitrogenous resins and being designed to give therewith bodies which are highly resistant to marring, comprise those acids which contain an ethylenic group which may be alpha-beta ethylenic (C=C—C=O). Usually, the acid is relatively compatible with respect to the other reaction components and is capable of forming an interpolymer or copolymer with the essentially neutral polyester. This acid can be incorporated with the polyester component at any convenient stage. It can be added to the polyester prior to the addition of the monomer, or it can be added with the monomer. Likewise, it can be added subsequently to the addition of the monomer but prior to the final interpolymerization. The ethylenically unsaturated acid component is believed at least in part to interpolymerize with the base polyester and/or the monomer or the interpolymer of the two, to leave carboxyls as polar groups which are bound to the interpolymer molecules. Examples of the foregoing acids include monocarboxylic acids containing at least 3 carbon atoms, such as acrylic acid, methacrylic acid, crotonic acid, isocrotonic acid, vinyl acetic acid, ethacrylic acid, dimethyl acrylic acid, teracrylic acid, angelic acid, and tiglic acid; dicarboxylic acids such as maleic acid, fumaric acid, itaconic acid and methyl maleic acid; and other ethylenically unsaturated mono, di and polycarboxylic acids. Generally, the acids contain fewer than 10 carbon atoms and are preferably employed in amounts of about 0.5 to 5 percent by weight based upon the weight of the polymer or interpolymer although large or smaller amounts may be utilized if desired. As will be apparent from the specific examples, the free ethylenically unsaturated carboxylic acid may be incorporated in the interpolymer together with the olefinic monomer, or prior to, or subsequent to the addition of the monomer, as may be desired.

The polymerization of the second step ester with one or more of the monomer compounds selected from the group disclosed hereinabove and the ethylenically unsaturated acid must be carried out in an inert, non-reactive solvent or diluent in order that soluble, ungelled copolymers and interpolymers will be obtained. Suitable diluents or solvents include xylene, toluene, carbon tetrachloride, ethylene dichloride, or other non-reactive material; that is, one that does not react with either reactant to an appreciable extent, and which is a solvent or diluent for both the second step ester and the ethylenic monomer.

The quantity of solvent or diluent utilized is not critical and may be varied widely. For example, a solvent or diluent may be employed in a proportion of 0.10 to 10 or more parts by weight based on the total weight of the copolymerizable components of the polymerization mixture.

The quantity of the ethylenic monomer which is included in the polymerizable mixture of polyester and ethylenic carboxylic acid is also subject to wide variation. For example, the copolymers and interpolymers of the present invention can be prepared utilizing in the polymerizable mixture proportions as low as five or ten percent by weight, or lower, of the ethylenically unsaturated compound based upon the weight of the second step ester which is utilized. On the other hand, the ethylenic monomer may be employed in an amount as high as 75 or 80 percent or even higher by weight, also based upon the weight of the second step ester in the polymerizable mixture. The fact that the ethylenic monomer can be utilized in such widely varying proportions in order to obtain soluble, ungelled copolymers and interpolymers constitutes an important advantage of the present invention. Heretofore, it has been believed that the use of more than about 15 percent by weight of the ethylenic monomer would result in the production of a copolymer or interpolymer having a gelled composition and being insoluble in conventional solvents.

A polymerization catalyst is preferably included in the polymerizable mixture. Typical catalysts which may be utilized include the peroxygen compounds such as silver peroxide, the perborates, the percarbonates, benzoyl peroxide, o,o-dichlorolbenzoyl peroxide, o,o-dibromobenzoyl peroxide, tertiary butyl hydroperoxide, cumene hydroperoxide, lauroyl peroxide, caproyl peroxide, acetone peroxide, pelargonyl peroxide, tetralin peroxide, para-menthane hydroperoxide, diisopropylbenzene hydroperoxide, as well as other polymerization catalysts including the diazo compounds and the like. The quantity of catalyst utilized may be varied widely. In general, however, it may be stated that the polymerization is preferably carried out in the presence of about 0.1 to about 5 percent by weight based upon the weight of the copolymerizable materials in the polymerization mixture.

The polymerizable mixture, including the catalyst, is preferably heated to a temperature of about 75 degrees to 150 degrees C. or even higher. A very satisfactory temperature is obtained upon a steam bath, which is, of course, at a temperature of about 100 degrees C. The time required for the polymerization to take place varies ordinarily from about 2 to 16 hours depending upon the polymerization conditions and the particular ethylenic monomer which is utilized. Preferably, the reaction is carried out under an inert gas such as carbon dioxide, nitrogen, or the combustion products resulting from the burning of butane in an atmosphere of air. The polymerization may also be achieved by irradiation of the mixture with actinic light, in the presence or absence of catalysts and at room temperature or at greatly elevated temperatures.

The resulting copolymer when solvent-free is generally a heavy, homogeneous resinous mass which is too viscous to pour at room temperature but which still retains flow properties under such conditions. The composition is homogeneous and, as will be demonstrated hereinafter, deposits homogeneous films; however, it is to be understood that the compositions may contain small quantities of other copolymers and also small quantities of homopolymers. The product is soluble in xylene, toluene, or the like hydrocarbon solvents.

The products of polymerization of the polyester, the monomer and the free unsaturated carboxylic acids, in accordance with the provisions of the present invention may be mixed, or combined with amine resins such as melamine-formaldehyde resin or urea-formaldehyde resins, to provide clear, compatible compositions which can be spread as coatings on solid surfaces and cured to a high state of hardness. In this way, it is possible to derive from a glyceride oil and a monomer a product having many of the advantages of the oil-monomer system, but also being capable of hardening to a high state of mar resistance.

In the preparation of the nitrogen-containing resin, other amines or amides may be employed. Likewise, other carbonyl compounds such as acetaldehydes, butyraldehyde, and others may be substituted for formaldehyde. Since melamine and urea have been most extensively investigated of the amino compounds and since formaldehyde is the most common of the aldehydes, especial emphasis is placed upon them as starting ingredients for the amine-aldehyde resins.

While improvement in compatibility of some compositions for nitrogeniferous resins is often quite pronounced, it is to be recognized that the inherent solubility characteristics of the interpolymerizable mixtures vary for different monomers and neutral esters of (a) hydroxy esters of drying oil acids and polyhydric compounds and (b) unsaturated polycarboxylic acids. Some of the possible systems may possess considerable compatibility with respect to nitrogenous resins, even without added acrylic acid or similar ethylenic, monocarboxylic acid. However, the general combination of added acids and the interpolymerizable mixtures are novel, even in the absence of added nitrogenous resins. The acid-modified compositions will possess increased adhesion for aluminum or the like and perhaps other valuable properties accordingly, the invention includes the use of the added acids broadly regardless of omissions or inclusions of nitrogenous resins or other modifiers.

The interpolymers and mixtures thereof with resins, containing the ethylenically unsaturated acid, are useful for coating materials such as wood, stone, brick, plaster, or the like. They can also be applied to metals such as iron, aluminum, etc.

The homogeneous composition which is obtained in the polymerization reaction can be diluted with non-reactive diluents or solvents selected from those disclosed hereinabove, or their equivalent, to substantially any degree to obtain a desired viscosity and concentration of solids in the solutions. The solutions can be applied by the conventional methods of coating such as spraying, brushing or roller coating. The solutions may also be catalyzed to promote drying, with conventional siccatives from the paint and varnish arts including oleates, linoleates, naphthenates and the like of cobalt, nickel, manganese, lead, cerium, lanthanum and other similar metals. The siccatives are designed to effect cross-linking of the ester molecules at points of unsaturation in the fatty acid molecules. Preferably, the siccative compound is employed in an amount of about 0.01 to 1 or 2 percent by weight based upon the solids content (percentages are calculated on the basis of the active metal).

When films of the foregoing solutions are applied to metal, concrete, brick, wood, or similar surfaces, the solvent utilized in preparing the compositions evaporates and the remaining resin may be subjected to baking at a temperature of about 100 degrees C. to 300 degrees C. or any other temperature which will effect hardening of the plastic material without undue charring or discoloration. Pigments, extenders and the like may also be added to the compositions to give useful results.

In the above description, special emphasis has been placed upon products which are copolymers or interpolymers of ethylenically unsaturated compounds, ethylenically unsaturated carboxylic acids and essentially neutral esters of alpha-beta unsaturated polycarboxylic acids with hydroxy esters of drying oil acids, or mixtures of such products and amine resins. However, it is also possible to further modify such copolymers or interpolymers. For example, the copolymers and interpolymers or the components thereof can be admixed with cyclopentadiene or dicyclopentadiene, or other cyclopentadiene homopolymers, in an autoclave and subjected to a temperature of about 250 degrees to 350 degrees C. The pressures utilized may be those autogenously generated or even higher. The resulting products are useful copolymers and interpolymers modified with cyclopentadiene. Other modifying materials may also be employed. Such other modifiers include polyesters of glycols and unsaturated polycarboxylic acids, or modifications thereof comprising mixed polyesters of a glycol, the alpha-beta unsaturated polycarboxylic acid and saturated polycarboxylic acids such as succinic acid or phthalic acid.

The following examples are intended to illustrate more fully the preparation of copolymers and interpolymers in accordance with the practice of this invention. The examples are not, however, intended to limit the scope of the invention, for there are, of course, numerous possible variations and modifications.

EXAMPLE I

This example illustrates the preliminary alcoholysis of glyceride oil and the subsequent esterification thereof with a dibasic acid containing an ethylenic group to provide an ester which is essentially neutral and which can be subsequently combined with an ethylenic monomer and an ethylenically unsaturated carboxylic acid.

The alcoholysis of glyceride oils is conventional in the alkyd resin art. The techniques employed are also applicable to the preparation of partial glycerides that can be esterified with dicarboxylic acids containing an alpha-beta ethylenic group in accordance with this invention. The method is illustrated by the alcoholysis of linseed oil with glycerine, which was conducted as follows:

In the reaction, a 5 liter, 3 necked glass flask equipped with a reflux condenser, an agitator and a thermometer, was employed as a reaction vessel. The oil in an amount of 2,212.5 grams (2.5 moles) was introduced into the flask along with 169.3 grams (1.67 moles plus a 10 percent excess) of glycerol. The mixture was blanketed with an inert gas (from combustion of butane) and was then heated with agitation to 190 degrees C. At this temperature, 1.25 grams of litharge was added as an alcoholysis catalyst. The mixture was maintained at 190 degrees C. until alcoholysis was complete. The product was suitable for esterification with any of the dibasic acids herein disclosed. Similar methods are applicable to the alcoholysis of other oils such as soya oil, safflower oil, cottonseed oil and the like.

The esterification with an alpha-beta ethylenic dicarboxylic acid of the preceding product of the alcoholysis of linseed oil and glycerol is typical and was conducted as follows:

A 32.5 gram quantity (2.5 moles) of itaconic acid was introduced into the alcoholysis product of the linseed oil and a reflux condenser and an azeotropic separator were applied to the reaction flask described hereinabove and esterification was carried to completion at 210 degrees C., using xylene as the solvent. The reaction was continued for 7 hours, at which time, it was stopped and the product was filtered. The product was a polyester which had an acid value of 9.5, a hydroxyl value of 29.3 and a solids content of 93.8 percent by weight. The Gardner color was 10 and the Gardner viscosity was G. In the final ester product, 60 molar percent of the combined hydroxyl groups were of fatty acids and 40 molar percent were of itaconic acid and the diglycerides of linseed oil acids. It could be mixed with monomers and with ethylenic carboxylic acids and anhydrides to give compositions possessing excellent adhesion to metals.

This procedure may be employed to prepare various neutral esters of itaconic acid and monohydric esters of drying oil acids.

The apparatus above described and the method employed in connection therewith was employed to prepare a series of polyesters of polyols and mixtures of itaconic acid and drying oil acids or partial esters of drying oil acids. The composition and certain of the properties of the polyesters are presented in Table A as follows:

Table A

| No. | Oil | Percent Oil | Percent Polyol Dibasic Ester | Percent Free Polyol | Polyol | Molar Percent Hydroxyl As Itaconate | Gardner Viscosity | Acid Value, Av. |
|---|---|---|---|---|---|---|---|---|
| 1 | Soy | 87.8 | 11.7 | 0.5 | Ethylene glycol | 33 | A | 10.2 |
| 2 | Soy | 86.2 | 13.3 | 0.5 | do | 36.5 | A | 10.9 |
| 3 | Soy | 84.5 | 14.9 | 0.6 | do | 40 | | 14.6 |
| 4 | Soy | | | | do | 45 | A | 10.3 |
| 5 | Soy | 78.5 | 20.7 | 0.9 | do | 50 | | 12.8 |
| 6 | Soy | 78.5 | 20.7 | 0.9 | Glycerol | 50 | | 10.11 |
| 7 | Soy | 87.8 | 11.7 | 0.5 | do | 33 | A | 9.5 |
| 8 | Soy | 84.5 | 14.9 | 0.6 | do | 40 | | 8.4 |
| 9 | Soy | 87.4 | 12.1 | 0.5 | Pentaerythritol | 33 | A | 11.6 |
| 10 | Soy | 85.7 | 13.7 | 0.6 | do | 36.5 | G | 12.0 |
| 11 | Soy | 84.5 | 14.9 | 0.6 | do | 40 | | 8.8 |
| 12 | Lin | 87.8 | 11.7 | 0.5 | Ethylene glycol | 33 | A | 10.2 |
| 13 | Lin | 84.5 | 14.9 | 0.6 | do | 40 | | 10.6 |
| 14 | Lin | 87.9 | 11.6 | 0.5 | Glycerol | 33 | A | 10.6 |
| 15 | Lin | 86.2 | 13.3 | 0.5 | do | 36.5 | E | 9.6 |
| 16 | Lin | 84.5 | 14.9 | 0.6 | do | 40 | A | 14.0 |
| 17 | Lin | 87.4 | 12.1 | 0.5 | Pentaerythritol | 33 | A | 8.4 |
| 18 | Lin | 85.7 | 13.7 | 0.6 | do | 36.5 | H | 10.00 |
| 19 | Lin | 83.9 | 15.4 | 0.7 | do | 40 | A | 10.1 |
| 20 | Saff | 87.8 | 11.7 | 0.5 | Glycerol | 33 | A | 8.0 |
| 21 | Saff | 84.5 | 14.9 | 0.6 | do | 40 | A | 10.8 |
| 22 | Dh. C | 87.8 | 11.7 | 0.5 | Ethylene glycol | 33 | | 4. |
| 23 | Dh. C | 84.5 | 14.9 | 0.6 | do | 40 | | 7.4 |

The abbreviations: lin.=linseed; soy=soybean; Saff.=Safflower; Dh. C.=dehydrated castor.

These esters can be interpolymerized with liquid, compatible compounds containing the C<=CH₂ group and ethylenically unsaturated carboxylic acids to produce valuable coating compositions which are compatible with melamine and the like resins and which have improved adhesion to metals such as aluminum and the like.

In the preceding Table A itaconic acid was employed as the ethylenically unsaturated dicarboxylic acid component of the polyester. However, neutral, or essentially neutral mixed esters of polyols, fatty acids, and other polycarboxylic acids containing an alpha-beta ethylenic group may be employed with monomers and free ethylenic acids in the preparation of valuable interpolymers. For example, itaconic acid may be replaced in the polyester by fumaric acid. A very valuable series of esters may also be prepared by the use of maleic acid (or its anhydride). These constitute the most valuable acids from a commercial viewpoint, but other dicarboxylic acids containing an alpha-beta ethylenic group are also operative. Since commercial considerations are often subject to change, it is intended to include such other acids within the scope of the invention. Likewise, the several dicarboxylic acids may contain substituents such as one or more chlorine atoms, alkyl groups and other groups. These will often affect the solubility characteristics of the ester products and the polymers therefrom by interpolymerization reactions, but the resulting products are nevertheless useful for many purposes.

Esters of maleic acid and fumaric acid prepared by the techniques described for the preparation of esters of itaconic acid are presented in Table B. In the latter, the numerals in the column headed "Hydroxyl" designate molar percent hydroxyls which are esterified by the unsaturated dicarboxylic acids.

Table B

| No. | Oil | Polyol | Dibasic Acid | Hydroxyl |
|---|---|---|---|---|
| 1 | Linseed | Pentaerythritol | Maleic | 25 |
| 2 | do | do | do | 29 |
| 3 | do | do | do | 33 |
| 4 | do | do | do | 40 |
| 5 | do | do | do | 50 |
| 6 | Soya | do | do | 33 |
| 7 | do | Ethylene glycol | do | 33 |
| 8 | Linseed | Pentaerythritol | Fumaric | 33 |
| 9 | do | Glycerine | do | 33 |

A part of the ethylenically unsaturated dicarboxylic acids disclosed in Table B can be replaced by a corresponding amount of a dibasic acid free of ethylenic groups and being represented by phthalic acid, sebacic acid, adipic acid, azelaic acid and others. A portion of the oil utilized can also be replaced by such an acid if desired. Naturally, such substitutions tend to reduce the ethylenic functionality of the esters and to modify the properties of the ultimate interpolymers, which is often desirable. There is no absolute minimum of the non-ethylenic acid since the products containing no saturated dibasic acid are fully operative. However, in general, it may be stated that such dibasic acid when present, is employed in an amount of about 1 to 50 percent by weight of the dibasic acid components. The neutral esters described hereinabove can be copolymerized with a wide variety of liquid soluble ethylenic compounds and ethylenic carboxylic acids (such as have been mentioned), which may be employed in a wide range of proportions. For example, the copolymerizable mixtures may contain only small amounts of the ethylenic compound, e.g. 5 to 10 percent by weight based upon the weight of the total mixture. On the other hand, the mixtures may contain much larger amounts of the ethylenic compound, e.g. up to 75 or 80 percent or more by weight based upon the weight of the total mixture.

Various of the polyesters from the foregoing Tables A and B were admixed with soluble, liquid ethylenic compounds containing the C<=CH₂ group, preferably attached to a negative group and ethylenic carboxylic acids, to provide copolymerizable mixtures or interpolymerizable mixtures which were of improved compatibility with resins derived by condensing an amine or amide and a carbonyl compound to provide mixtures capable of curing into interpolymers of improved hardness, and which could be sheeted out or spread as films upon various surfaces, and dried or cured. Some of these are illustrated by the appended examples.

EXAMPLE II

In this example, an ester of linseed oil, pentaerythritol and maleic anhydride, in which 33 molar percent of the available hydroxyls were esterified by the maleic anhydride was employed. The ester product was of a solids content of 98.5 percent. The polyester in an amount of 300 grams was mixed with 500 grams of styrene, 200 grams of vinyl butyl ether, 10 grams of acrylic acid, and 20 grams of cumene hydroperoxide (a catalyst). The mixture was dissolved in 1000 grams of xylene in which it was refluxed for 16 hours to obtain a conversion of 66.5 percent. The product was a clear solution to which melamine resins could be added.

EXAMPLE III

In accordance with this example, a substantially neutral polyester was prepared of linseed oil, pentaerythritol and maleic anhydride. The ester included 33 molar percent of the available hydroxyls in ester linkage with the carboxyls of the maleic anhydride The polyester had a solids content of 98.5 percent by weight. The polyester in an amount of 500 grams was mixed with 150 grams of acrylonitrile, 350 grams of styrene, 10 grams of acrylic acid and 40 grams of cumene hydroperoxide. Xylene in amount of 1500 grams was employed as a solvent and the mixture was refluxed for 7 hours.

EXAMPLE IV

In this example, a polyester was prepared from linseed oil, pentaerythritol and maleic anhydride containing 25 percent, upon a molar basis, of the available hydroxyls in combination with the carboxyls of the maleic anhydride. This polyester had a solids content of 93 percent and a viscosity of G. A polyester in an amount of 500 grams was mixed with 375 grams of styrene, 125 grams of acrylonitrile, 20 grams of acrylic acid and 10 grams of cumene hydroperoxide, 1,000 grams of xylene being employed as a solvent. The mixture was refluxed for 5 hours to provide a turbid solution which when spread upon metal dried to a clear, mar-resistant film.

EXAMPLE V

The substantially neutral polyester of this example was of linseed oil, pentaerythritol and maleic anhydride, the molar percentage of hydroxyls combined with the maleic acid being 33. The solids content was 98.5. To 500 grams of this ester were added dropwise 280 grams styrene, 120 grams alpha methyl styrene, 100 grams acrylonitrile, 10 grams acrylic acid, and 40 grams of cumene hydroperoxide. Xylene (1500 grams) was employed as a solvent. The solution was refluxed 7 hours and excess monomer was distilled to provide a product which could be spread and dried to produce hard, adherent and clear films. The mixture could be combined with melamine formaldehyde resins.

EXAMPLE VI

The polyester of this example comprised linseed oil, pentaerythritol and maleic anhydride, in which 50 molar percent of the available hydroxyls were combined in ester linkages with the maleic acid. A reaction charge was made up comprising 550 grams of polyester, 450 grams methyl methacrylate, 10 grams acrylic acid and 10 grams of benzoyl peroxide, all dissolved in 1000 grams of xylene. The solution was maintained 5 hours at 100° C. The homogeneous product, when mixed with solvent, could be spread and dried to a hard, clear, adherent state, or further modified with melamine resins if desired.

EXAMPLE VII

The essentially neutral ester of the example comprised a linseed pentaerythritol-maleic ester in which 33 molar percent of the total hydroxyls were accounted for by esterification with maleic anhydride. The interpolymerizable mixture comprised 475 grams of the polyester, 394 grams of styrene, 131 grams of alpha-methyl styrene, 10 grams of acrylic acid, 40 grams of catalyst (cumene hydroperoxide), and as a solvent, 1000 grams of high flash naphtha. The mixture was refluxed 5 hours. Films from this solution were clear and adherent.

In the preceding Examples II through VII, the acrylic acid component may be partially or completely replaced by other ethylenically unsaturated acids such as crotonic acid, maleic acid, fumaric acid, itaconic acid, allyl acetic acid, angelic acid, vinyl acetic acid, and many others. Naturally, many of these are more economical or more effective than others for some purposes, but all do provide similar reactive groups and may be used.

The following examples demonstrate the improvements in compatibility of the interpolymers of this invention with respect to melamine resins and the improvements in hardness of films from the mixtures attending the inclusion of a free ethylenic acid such as acrylic acid, as a monomer component.

EXAMPLE VIII

In this example, a neutral, or nearly neutral ester of maleic acid and a hydroxy ester of soybean oil acids and pentaerythritol was prepared by the methods previously described for preparing neutral esters of this type. The partial ester of soya oil and pentaerythritol comprised 33 molar percent of free hydroxyls which were esterified with maleic anhydride.

A 750-gram quantity of the ester was mixed with 750 grams styrene, 1500 grams of aromatic naphtha (boiling range 135–185° C., kauri-butanol value 75) and 15 grams cumene hydroperoxide. The mixture was refluxed for 23 hours, 1 milliliter of cumene hydroperoxide being added each hour. The viscosity was D–E. Films of the material were clear when baked at 250° C. This comprised interpolymer A of the example.

To the interpolymer resin was added 25 percent by weight based on total resin solids, of a commercial melamineformaldehyde resin sold as Melmac 245-8. This resin is soluble but has limited tolerance in mineral spirits. The mixture was spread as a film and cured for 30 minutes at 300° F. The film was definitely hazy, showing incompatibility in the mixture. The Sward hardness was 10.

A second sample of the neutral ester of soya oil, pentaerythritol and maleic acid in an amount of 1000 grams was mixed with 1000 grams of styrene in 1500 grams of the aromatic naphtha and 20 grams of acrylic acid was added. The mixture was catalyzed with 5.36 grams of cumene hydroperoxide which was repeated five times, as needed. Refluxing stopped after 5 hours. The product was resin interpolymer B of the example.

To the mixture was added 25 percent, based on total solids of the same melamine-formaldehyde resin specified above. The product gave a clear film which when baked at 300° F. for 30 minutes had a Sward hardness of 20. This example definitely shows an improvement in compatibility of interpolymer resins containing an added acid containing a polymerizable ethylenic group, with respect to melamine-formaldehyde resins.

EXAMPLE IX

The base neutral ester of soya oil acids, pentaerythritol and maleic acid was similar to that in Example VII. To a 900-gram portion of the ester was added 600 grams of styrene and 1500 grams of naphtha which was the same as in Example VIII. The mixture was catalyzed with 4 grams of cumene hydroperoxide, which was replenished hourly as the mixture refluxed. Refluxing was continued for 31 hours. The product was interpolymer A of this example.

A sample of the interpolymer was incorporated with melamine-formaldehyde resin as in Example VIII. Films, when cured at 300° F. for 30 minutes were hazy and of a Sward hardness of 6.

A further sample of the neutral ester weighing 1100 grams was mixed with 900 grams of styrene, and 20 grams of acrylic acid and 1500 grams of the naphtha specified in Example VIII. The solution was catalyzed with 5.35 grams of cumene hydroperoxide and was refluxed for 5 hours. During this time, four further additions of catalyst were made.

The material, when spread as a coating and baked at 300° C., formed clear, hard films. This was interpolymer (B) in this example.

A sample of the interpolymer B was mixed with the same melamine-formaldehyde resin specified in Example VIII in a concentration of 25 percent by weight, based on total solids. The mixture was compatible and films thereof when baked at 300° F. for 30 minutes, were clear and had a hardness of 16. The improvement in compatibility and hardness attending the addition of acrylic acid was pronounced.

EXAMPLE X

In this example, a sample of the interpolymer of 750 grams of ester and 750 grams of styrene and being free of acrylic acid, denoted as A in Example VIII, was mixed with a melamine-formaldehyde resin of good compatibility and sold commercially as Melmac 247–10, to form a solution of 50 percent by weight, based upon solids content, of the latter resin. Films of this material when baked at 300° F. for 30 minutes, were hazy and a Sward hardness of 20.

When the second interpolymer (B) of Example VIII containing acrylic acid as a polymerizable ethylenic acid having a terminal >C=CH$_2$ group was employed with the above proportion of melamine-formaldehyde resin (Melmac 247–10), compatible, clear films having a Sward hardness 26 resulted.

EXAMPLE XI

In this example, the interpolymers of lower styrene content described respectively as A and B in Example IX are employed with the Melmac 247–10 above described. The content of the latter was 50 percent by weight based upon resin solids. The films containing interpolymer A in which acrylic acid was omitted, were hazy. The Sward hardness was 14.

In the films containing interpolymer B in which acrylic acid was incorporated with the monomer, the interpolymer and the melamine-formaldehyde resin were compatible. The films were clear and of a Sward hardness of 24.

In Examples VII through XI, soya acids or soya oil could be replaced by linseed oil or acids, cotton seed oil or acids and others. Pentaerythritol could be replaced by glycerol, sorbitol, mannitol, etc., or mixtures of two or more. Maleic acid could be replaced by fumaric acid, itaconic acid, and the like. Styrene could be replaced by monomers such as vinyl acetate, diallyl phthalate, ethyl acrylate, methyl methacrylate, or acrylonitrile. Acrylic acid could be replaced by other acids containing a polymerizable ethylenic group and being represented by crotonic acid, maleic acid, fumaric acid, and itaconic acid. Melamine-formaldehyde resin may be replaced by other amino resins such as urea-formaldehyde resins of soluble grade.

Other catalysts, such as benzoyl peroxide, lauroyl peroxide, butyl hydroperoxide, etc., may be substituted for cumene hydroperoxide. Naturally, the properties will vary for different combinations of the foregoing materials, but this is often advantageous in tailoring the materials to meet special requirements.

Although specific examples of the invention have been set forth above, it is not intended to limit the invention solely thereto, but to include all of the variations and modifications falling within the scope of the appended claims.

This application is a continuation-in-part of my co-pending application, Serial No. 334,970, filed February 3, 1953.

I claim:

1. A method of forming a xylene-soluble, ungelled interpolymer resin characterized by its ability to dry to a hard, clear film, and which is compatible with amine-aldehyde resins, which method comprises the steps of dissolving in a nonreactive solvent, a mixture consisting essentially of (A) an ester which has an acid number below 15 and in which the acid component is an alpha-beta ethylenically unsaturated dicarboxylic acid and the alcohol component is an ester of a polyhydric alcohol having from 2 to 6 hydroxyl groups, and a drying oil acid, the esters formed having a fatty acid content, calculated upon the basis of equivalent glyceride oil, of about 75 to about 90 percent by weight of the total mixture of reactive components of the ester system, and the ethylenically unsaturated polycarboxylic acid ester groups in the molecule of the resulting ester of the unsaturated dicarboxylic acid and the fatty acid constituting about 10 to about 25 percent by weight of the total ester product; (B) about 5 percent to about 80 percent by weight based upon the ester component of a monomer of the class consisting of vinyl toluene, styrene, a mixture of styrene and alpha methyl styrene, methyl methacrylate, a mixture of styrene and butadiene, a mixture of styrene and acrylonitrile, a mixture of styrene and vinyl ether, a mixture of styrene and vinyl butyl ether, a mixture of vinyl acetate and vinyl chloride, vinyl acetate, a mixture of styrene and methyl methacrylate, a mixture of acrylonitrile and alpha methyl styrene, and a mixture of styrene and cyclohexene; and (C) about 0.5 to about 5 percent by weight based upon the interpolymerizable mixture of an ethylenically unsaturated carboxylic acid selected from the group consisting of acrylic acid, methacrylic acid, crotonic acid, isocrotonic acid, vinyl acetic acid, ethacrylic acid, teracrylic acid, angelic acid, tiglic acid, maleic acid, fumaric acid, itaconic acid, and methyl maleic acid, and a peroxidic catalyst of addition interpolymerization of the mixture, the catalyst being present in an amount of 0.1 to 5 percent by weight based upon the interpolymerizable mixture, and refluxing the mixture until said interpolymer is formed, all of component (C) being reacted with components (A) and (B).

2. The interpolymer when formed by the method of claim 1.

3. The method of claim 1 in which the solvent is employed in amount of about 0.1 to about 10 parts by weight based upon the interpolymerizable component.

4. The method of claim 3 in which the solvent is of a class consisting of toluene and xylene.

References Cited in the file of this patent

UNITED STATES PATENTS

| | | |
|---|---|---|
| 2,190,789 | Hubbuch | Feb. 20, 1940 |
| 2,195,362 | Ellis | Mar. 26, 1940 |
| 2,407,479 | D'Alelio | Sept. 10, 1946 |
| 2,470,752 | Bobalek | May 24, 1949 |
| 2,559,466 | Root | July 3, 1951 |
| 2,600,457 | Wynstra | June 17, 1952 |
| 2,600,623 | Daniel et al. | June 17, 1952 |

UNITED STATES PATENT OFFICE
CERTIFICATE OF CORRECTION

Patent No. 2,939,854                        June 7, 1960

Roger M. Christenson

It is hereby certified that error appears in the printed specification of the above numbered patent requiring correction and that the said Letters Patent should read as corrected below.

Column 5, line 61, for "2,6-diffuorostyrene" read -- 2,6-difluorostyrene --; column 6 line 7, for "bendoate" read -- benzoate --; same line, for "p-ethoxybendoate" read -- p-ethoxybenzoate --; line 15, for "acryalte" read -- acrylate --; line 32 for "ally" read -- allyl --.

Signed and sealed this 25th day of April 1961.

(SEAL)
Attest:

ERNEST W. SWIDER
Attesting Officer

DAVID L. LADD
                                              Commissioner of Patents